(12) United States Patent
Krainer

(10) Patent No.: US 11,742,157 B2
(45) Date of Patent: Aug. 29, 2023

(54) CONTACT BOUNCE REDUCTION SYSTEM

(71) Applicant: Hitachi Energy Switzerland AG, Baden (CH)

(72) Inventor: Per Krainer, Ludvika (SE)

(73) Assignee: HITACHI ENERGY SWITZERLAND AG, Baden (CH)

( * ) Notice: Subject to any disclaimer, the term of this patent is extended or adjusted under 35 U.S.C. 154(b) by 0 days.

(21) Appl. No.: 18/010,712

(22) PCT Filed: May 28, 2021

(86) PCT No.: PCT/EP2021/064404
§ 371 (c)(1),
(2) Date: Dec. 15, 2022

(87) PCT Pub. No.: WO2021/254764
PCT Pub. Date: Dec. 23, 2021

(65) Prior Publication Data
US 2023/0197364 A1 Jun. 22, 2023

(30) Foreign Application Priority Data
Jun. 15, 2020 (EP) .................... 20179976

(51) Int. Cl.
*H01H 1/50* (2006.01)
*H01H 9/00* (2006.01)
(Continued)

(52) U.S. Cl.
CPC .............. *H01H 1/502* (2013.01); *H01H 1/30* (2013.01); *H01H 1/50* (2013.01); *H01H 9/0016* (2013.01);
(Continued)

(58) Field of Classification Search
None
See application file for complete search history.

(56) References Cited

U.S. PATENT DOCUMENTS 3,180,960 A 4/1965 Barkan et al.
5,175,403 A * 12/1992 Hamm ............... H01H 33/666
218/120
(Continued)

FOREIGN PATENT DOCUMENTS

CN 101325131 A 12/2008
CN 101454855 A 6/2009
(Continued)

OTHER PUBLICATIONS

Decision for Grant of Patent for Korean Patent Application No. 10-2022-7042749, dated Mar. 27, 2023, 3 pages.
(Continued)

*Primary Examiner* — Felix O Figueroa
(74) *Attorney, Agent, or Firm* — Sage Patent Group

(57) ABSTRACT

A contact bounce reduction system including: a movable member, and a contact bounce damping device including: a body, a first ball and a second ball, a first resilient member and a second resilient member, a piston. The first resilient member holds the first ball in the seat and the second resilient member holds the second ball in the seat when the piston is in a default extended position, and a third resilient member biases the piston towards the default extended position. The movable member actuates the piston towards the retracted position, causing the first ball and the second ball to move radially out from the seat, and the third resilient member to accumulate energy.

12 Claims, 3 Drawing Sheets

(51) Int. Cl.
*H01H 50/58* (2006.01)
*H01H 1/30* (2006.01)

(52) U.S. Cl.
CPC ....... *H01H 50/58* (2013.01); *H01H 2201/002* (2013.01)

(56) References Cited

U.S. PATENT DOCUMENTS

| | | | |
|---|---|---|---|
| 10,529,523 B2* | 1/2020 | Ehrhardt | H01H 79/00 |
| 10,714,289 B2* | 7/2020 | Minowa | H01H 50/04 |
| 11,107,643 B2* | 8/2021 | Schmidt | H01H 33/42 |
| 2011/0036812 A1 | 2/2011 | Nagatake et al. | |
| 2016/0254110 A1 | 9/2016 | Bartz et al. | |

FOREIGN PATENT DOCUMENTS

| | | |
|---|---|---|
| CN | 109148193 A | 1/2019 |
| DE | 1045511 B | 12/1958 |
| DE | 102017113416 B3 | 6/2018 |
| EP | 0641002 A1 | 3/1995 |
| EP | 1936645 A1 | 6/2008 |

OTHER PUBLICATIONS

International Search Report and Written Opinion of the International Searching Authority, PCT/EP2021/064404, dated Sep. 21, 2021, 12 pages.
Extended European Search Report dated Dec. 16, 2020, for European Patent Application No. 20179976.4, 9 pages.
Notification to Grant Patent Right for Invention for Chinese Patent Application No. 202180042623.3, dated May 29, 2023, 6 pages.

* cited by examiner

CONTACT BOUNCE REDUCTION SYSTEM

CROSS REFERENCE TO RELATED APPLICATIONS

This application is a 35 U.S.C. § 371 national stage application of PCT International Application No. PCT/EP2021/064404 filed on May 28, 2021, which in turn claims foreign priority to European Patent Application No. 20179976.4 filed on Jun. 15, 2020, the disclosures and content of which are incorporated by reference herein in their entirety.

TECHNICAL FIELD

The present disclosure generally relates to contact devices or switches such as electrical switches.

BACKGROUND

Electrical switches such as contactors or the spring-loaded actuator of tap changer mechanisms may comprise a movable contact and a second contact. The movable contact may be actuated from a first non-contact position relative to the second contact to achieve contact with the second contact. The second contact may be fixed or movable. In the latter case the movable contact may actuate the second contact when placed in contact with the second contact to reduce the risk of contact bounce.

The movable contact is usually configured to impact the second contact with great force. There is therefore a risk of contact bounce even if the second contact is movable.

SUMMARY

In view of the above, a general object of the present disclosure is to provide a contact bounce reduction system that solves or at least mitigates the problems of the prior art.

There is hence according to a first aspect of the present disclosure provided a contact bounce reduction system comprising: a movable member, and a contact bounce damping device comprising: a body, a first ball and a second ball arranged in the body, a first resilient member and a second resilient member, a piston partly arranged in and extending from the body, the piston being configured to be moved linearly between a default extended position and a retracted position relative to the body, and wherein the piston has a radial seat configured to partly receive the first ball and the second ball, wherein the first resilient member is configured to act with a radial force onto the first ball to hold the first ball in the seat when the piston is in the default extended position, wherein the second resilient member is configured to act with a radial force onto the second ball to hold the second ball in the seat when the piston is in the default extended position, and a third resilient member configured to bias the piston towards the default extended position; wherein the movable member is configured to move from a non-contact position relative to the piston to contact the piston and actuate the piston from the default extended position towards the retracted position with a force greater than a threshold value, causing the first ball and the second ball to move radially out from the seat, and the third resilient member to accumulate energy. The contact bounce reduction system further comprises a contact ring slidably arranged around the piston, and a fixed contact member electrically connected to the contact ring.

A high initial force is thereby applied to overcome the force of the first and second resilient member pressing a respective one of the first and second ball into the seat. The risk of contact bounce is thereby reduced. The initial speed of the piston when the movable member contacts the piston can also be increased.

In case the contact bounce reduction system forms part of an electrical device and is configured for carrying currents, fewer contact bounces results in fewer arcs and thus reduces the wear on the piston. Furthermore, high initial speed reduces the time that an arc is lit. The electrical energy that erodes the material of the piston may thereby be reduced.

After the first ball and the second ball have moved out from the seat the force to linearly move the piston is reduced, as it is mainly the third resilient member that determines the resistance of the piston at this point.

The movable member may be a movable contact.

The contact ring and the fixed contact member provides a large number of contact points between the piston and the contact ring. The large number of contact points leads to a smaller voltage drop over the contact, which in turn results in lesser generation of heat and reduced material degradation over time.

According to one embodiment the first ball and the second ball are arranged on opposite sides of the piston with respect to a longitudinal axis of the piston.

The first ball and the second ball may be arranged opposite to each other with respect to the longitudinal axis of the piston.

According to one embodiment the first resilient member and the second resilient member have longitudinal axes that are perpendicular to a longitudinal axis of the piston. The longitudinal axis of the first resilient member may thus be perpendicular to the longitudinal axis of the piston and the longitudinal axis of the second resilient member may thus be perpendicular to the longitudinal axis of the piston.

The longitudinal axis of the first resilient member may coincide with the longitudinal axis of the second resilient member.

According to one embodiment the first resilient member is a first spring and the second resilient member is a second spring.

The first spring may for example be a coil spring. The second spring may for example be a coil spring.

One embodiment comprises a third ball arranged axially between the third resilient member and the piston, wherein the third resilient member is configured to act with an axial force onto the third ball. The third ball bears against an inner end face of the piston. The third ball absorbs energy when the movable member impacts the piston, and the first ball and the second ball move out from the seat. This may further reduce the risk of contact bounce as the third ball will operate under the principles of Newton's cradle with respect to the movable member.

One embodiment comprises a first holding member configured, and wherein the body has a first channel in which the first resilient member is arranged, wherein the first holding member is removably arranged in the first channel to hold the first resilient member in position to act on the first ball.

One embodiment comprises a second holding member, and wherein the body has a second channel in which the second resilient member is arranged, wherein the second holding member is removably arranged in the second channel to hold the second resilient member in position to act on the second ball.

One embodiment comprises a third holding member, and wherein the body has a third channel in which the third resilient member is arranged, wherein the third holding member is removably arranged in the third channel to hold the third resilient member in position to act on the piston.

According to one embodiment the seat has a curved shape configured to bear against at least $1/8^{th}$ of the circumference of each of the first ball and the second ball.

There is according to a second aspect of the present disclosure provided an electrical device comprising the system according to the first aspect.

According to one embodiment the electrical device is a contactor or a tap changer for a transformer.

The transformer may for example a distribution transformer or a power transformer.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise.

BRIEF DESCRIPTION OF THE DRAWINGS

The specific embodiments of the disclosure will now be described, by way of example, with reference to the accompanying drawings, in which.

DETAILED DESCRIPTION

The disclosure will now be described more fully hereinafter with reference to the accompanying drawings, in which exemplifying embodiments are shown. The disclosure ept may, however, be embodied in many different forms and should not be construed as limited to the embodiments set forth herein; rather, these embodiments are provided by way of example so that this disclosure will be thorough and complete, and will fully convey the scope of the disclosure to those skilled in the art. Like numbers refer to like elements throughout the description.

Figure 1:
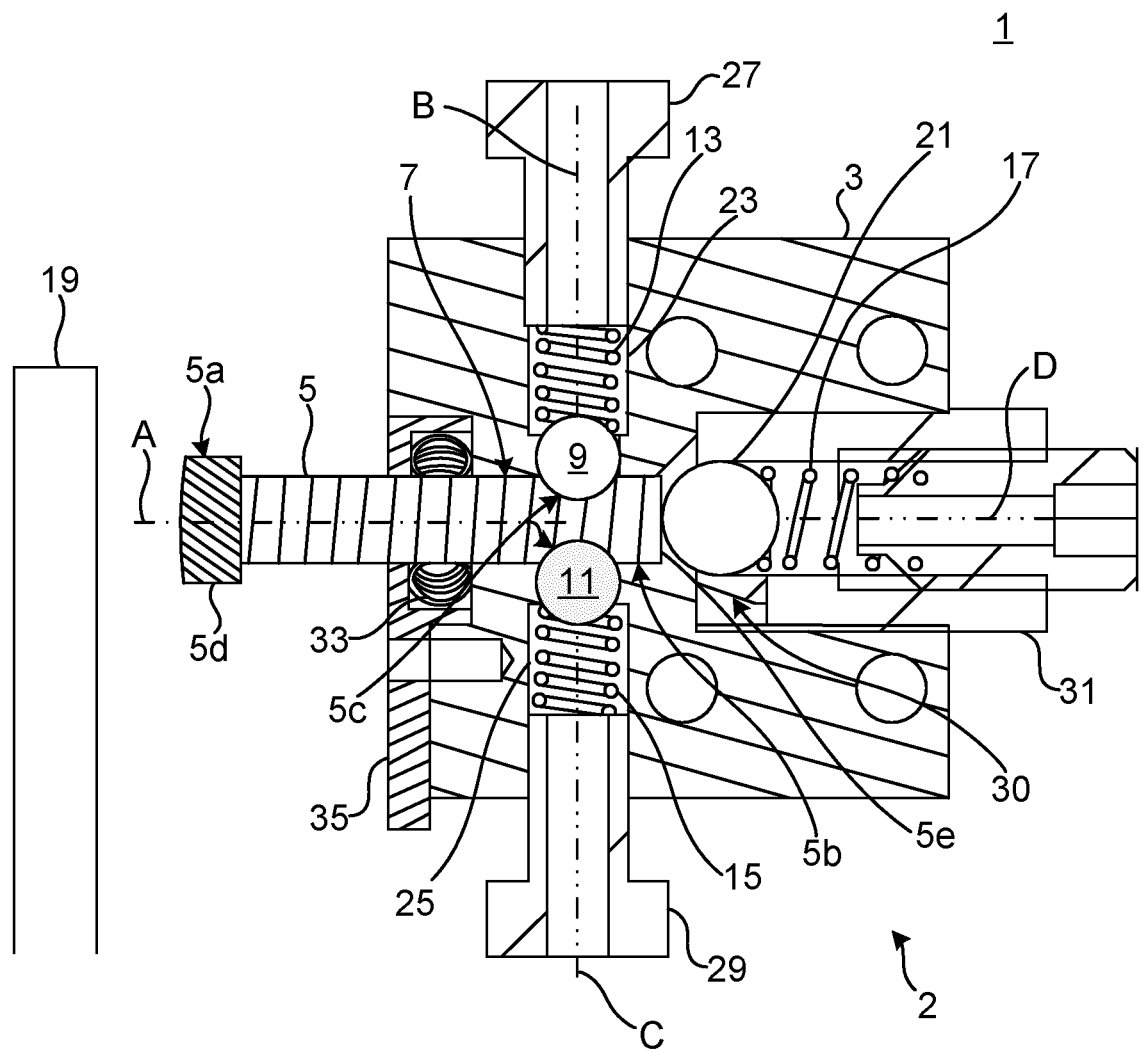
FIG. 1 schematically shows a cross-section of an example of a contact bounce reduction system.

FIG. 1 shows an example of a contact bounce reduction system 1. The contact bounce reduction system 1 may be for an electrical device such as a contactor or a tap changer.

The contact bounce reduction system comprises a contact bounce damping device 2.

The contact bounce damping device 2 comprises a body 3 and a piston 5. The body 3 has a piston channel 7 in which the piston 5 is arranged. The body 3 has an opening that forms the mouth of the piston channel 7. The piston 5 extends from the piston channel 7 and the body 3.

The piston 5 may be electrically conductive. The piston 5 may for example be made of metal such as copper or aluminium.

The piston 5 is configured to be linearly movable relative to the body 3. The piston 5 is configured to be moved linearly in the piston channel 7. The piston 5 is configured to be moved linearly between a default extended position relative to the body 3, shown in FIG. 1, and a retracted position. The piston 5 extends further from the body 3 in the default extended position than in the retracted position.

The piston 5 has an external end portion 5a arranged outside the body 3 both in the default extended position and in the retracted position of the piston 5. The piston 5 has an internal end portion 5b arranged inside the body 3 both in the default extended position and in the retracted position of the piston 5.

The piston 5 is provided with a radial seat 5c. The internal end portion 5b of the piston 5 is provided with the seat 5c. The seat 5c extends radially inwards. The seat 5c may be formed by a single recess extending circumferentially around the piston 5 or it may comprise two individual recesses.

The seat 5c may have a curved shape in a longitudinal section of the piston 5. The curved shape may for example be a circular arc.

The contact bounce damping device 2 comprises a first ball 9 and a second ball 11. The first ball 9 and the second ball 11 are arranged in the body 3. The first ball 9 may for example be made of metal. The second ball 11 may for example be made of metal.

The seat 5c is configured to partly receive the first ball 9. The seat 5c is configured to partly receive the second ball 11. The curved shape of the seat 5c may be configured to bear against at least $1/8^{th}$ of the circumference of the first ball 9 and of the second ball 11 when the first ball 9 and the second ball 11 are arranged in the seat 5c, in a longitudinal section of the piston 5.

The first ball 9 and the second ball 11 are aligned in the radial direction of the piston 5. The first ball 9 and the second ball 11 are arranged opposite to each other relative to the longitudinal axis A of the piston 5. The first ball 9 is thus arranged on one side of the longitudinal axis A and the second ball 11 is arranged on another side of the longitudinal axis A, opposite to each other.

The contact bounce damping device 2 comprises a first resilient member 13. The first resilient member 13 may be a spring such as a coil spring. The contact bounce reduction system 1 comprises a second resilient member 15. The second resilient member 15 may be a spring such as a coil spring.

The first resilient member 13 has a longitudinal axis B which is transversal to the longitudinal axis A of the piston 5. The longitudinal axis B may be perpendicular to the longitudinal axis A of the piston 5.

The second resilient member 15 has a longitudinal axis C which is transversal to the longitudinal axis A of the piston 5. The longitudinal axis C may be perpendicular to the longitudinal axis A of the piston 5.

The longitudinal axis B of the first resilient member 13 may be parallel with the longitudinal axis C of the second resilient member 15. The longitudinal axis B of the firs resilient member 13 may coincide with the longitudinal axis C of the second resilient member 15.

The first resilient member 13 is configured to act with a radial force onto the first ball 9. With the term "radial" is meant a direction that is perpendicular to the longitudinal axis A of the piston 5. When the piston 5 is in the default extended position the first resilient member 13 is configured to force the first ball 9 into the seat 5c.

The second resilient member 15 is configured to act with a radial force onto the second ball 11. When the piston 5 is in the default extended position the second resilient member 15 is configured to force the second ball 11 into the seat 5c.

The contact bounce damping device 2 comprises a third resilient member 17. The third resilient member 17 is configured to bias the piston 5 towards the default extended position. The third resilient member 17 is configured to accumulate energy when the piston 5 is moved from the default extended position towards the retracted position.

The third resilient member 17 has a longitudinal axis D which is parallel with the longitudinal axis A of the piston 5. The longitudinal axis D of the third resilient member 17 may coincide with the longitudinal axis A of the piston 5.

The first ball 9 and the second ball 11 maintain the piston 5 in the default extended position until a force greater than a threshold value acts on the piston 5 in a direction from the default extended position towards the retracted position.

The contact bounce reduction system 1 comprises a movable member 19. The movable member 19 will in the following be exemplified by a movable contact but could alternatively be a movable member that forms part of a damper. The movable contact 19 is configured to actuate the piston 5 from the default extended position to the retracted position. The movable contact 19 is configured to be moved relative to the body 3 and the piston 5. The movable contact 19 is configured to move from a non-contact position, shown in FIG. 1 relative to the piston 5 to a position in which it is in contact with the piston 5. The piston 5 has a head 5*d* and the movable contact 19 is configured to move from the non-contact position to a position in which it contacts the head 5*d*. The movable contact 19 is configured to actuate the piston 5 when in contact with the head 5*d*. The movable contact 19 is configured to actuate the piston 5 from the default extended position to the retracted position. The movable contact 19 is configured to apply a force onto the head 5*d* greater than a threshold value to move the piston 5 from the default extended position to the retracted position.

The head 5*d* may comprise a material with a high resistance to erosion from arcing. The head 5*d* may for example comprise a copper tungsten alloy.

The contact bounce damping device 2 may comprise a third ball 21 arranged in the body 3. The third ball 21 is arranged between the inner end face 5*e* of the piston 5 and the third resilient member 17. The third resilient member 17 is configured to bias the third ball 21 towards the inner end face 5*e* of the piston 5. Thus, when the piston 5 is impacted by the movable member 19 and moved towards the retracted position the third ball 21 at impact with the piston 5 absorbs energy and is subsequently moved together with the piston 5 as the third resilient member 17 is compressed and accumulates energy.

The body 3 has a first channel 23 in which the first resilient member 13 is arranged. The body 3 has a second channel 25 in which the second resilient member 15 is arranged. The first channel 23 and the second channel 25 may be arranged perpendicular to the longitudinal axis A of the piston 5 and opposite to each other.

The first resilient member 13 has a proximal end which bears against the first ball 9.

The contact bounce damping device 2 may comprise a first holding member 27 configured to be arranged in the first channel 23 and configured to bear against a distal end of the first resilient member 13. The first resilient member 13 is thereby set in compression to act with a predetermined force on the first ball 9, determined by the spring constant and the size of the first holding member 27. The first holding member 27 may be threadedly engaged with the body 3 to facilitate removal of the first holding member 27 from the body 3. The first holding member 27 may for example be a bolt.

The second resilient member 15 has a proximal end which bears against the second ball 11.

The contact bounce damping device 2 may comprise a second holding member 29 configured to be arranged in the second channel 25 and configured to bear against a distal end of the second resilient member 15. The second resilient member 15 is thereby set in compression to act with a predetermined force on the second ball 11, determined by the spring constant and the size of the second holding member 29. The second holding member 29 may be threadedly engaged with the body 3 to facilitate removal of the second holding member 29 from the body 3. The second holding member 29 may for example be a bolt.

The body 3 has a third channel 23 in which the third resilient member 17 is arranged. The third channel 23 and the third resilient member 17 share the same longitudinal axis D.

The contact bounce damping device 2 may comprise a third holding member 31 configured to be arranged in the third channel 30 and configured to bear against a distal end of the third resilient member 17. The third resilient member 17 is thereby set in compression to act with a predetermined force directly on the piston 5 or via the third ball 21, determined by the spring constant and the size of the third holding member 31. The third holding member 31 may be threadedly engaged with the body 3 to facilitate removal of the third holding member 31 from the body 3. The third holding member 31 may for example be a bolt or a sleeve.

As an alternative to the first holding member 27, the second holding member 29 and the third holding member 31, the first resilient member 13, the second resilient member 15 and the third resilient member 17 could be arranged in a respective closed inner chamber in the body. The holding members 27, 29 and 31 may facilitate assembly of the contact bounce damping device 2 and/or may be omitted, as desired.

The contact bounce damping device 2 may comprise a contact ring 33 slidably arranged around and in electrical contact with the piston 5. The contact ring 33 may be electrically conducting. The contact ring 33 may be made of metal such as copper or aluminium. The contact ring 33 may be arranged in the piston channel 7.

The contact bounce damping device 2 may comprise a fixed contact member 35 electrically connected to the contact ring 33.

The movable contact 19 may be configured to carry a current. When the movable contact 19 contacts the piston 5 a closed circuit may be achieved, and the current may flow from the movable contact 19 to the piston and further to the fixed contact member 35 via the contact ring 33.

The operation of the contact bounce reduction system 1 will now be described with reference to FIG. 2 and FIGS. 3*a*-3*b*.

In FIG. 1 the movable contact 19 is arranged in the non-contact position. The first ball 9 and the second ball 11 are resting in the seat 5*c*.

Figure 2:
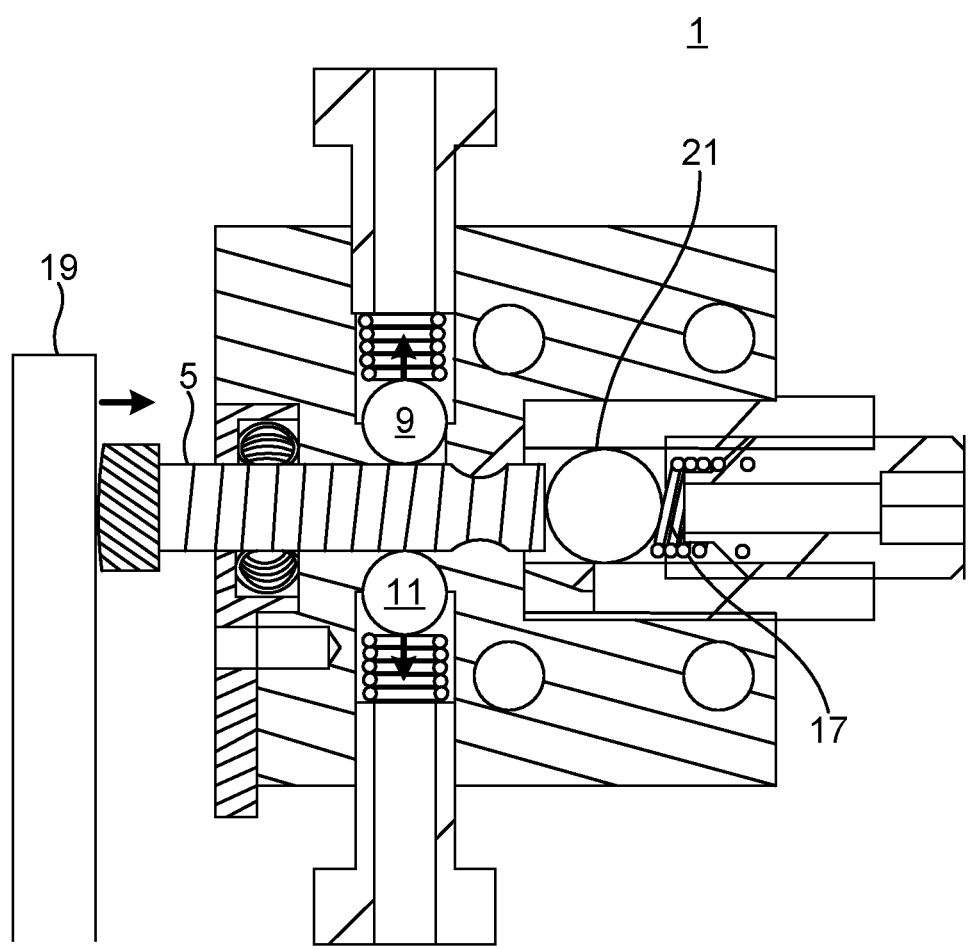
FIG. 2 shows the operation of the contact bounce reduction system in FIG. 1.
Figure 3A:
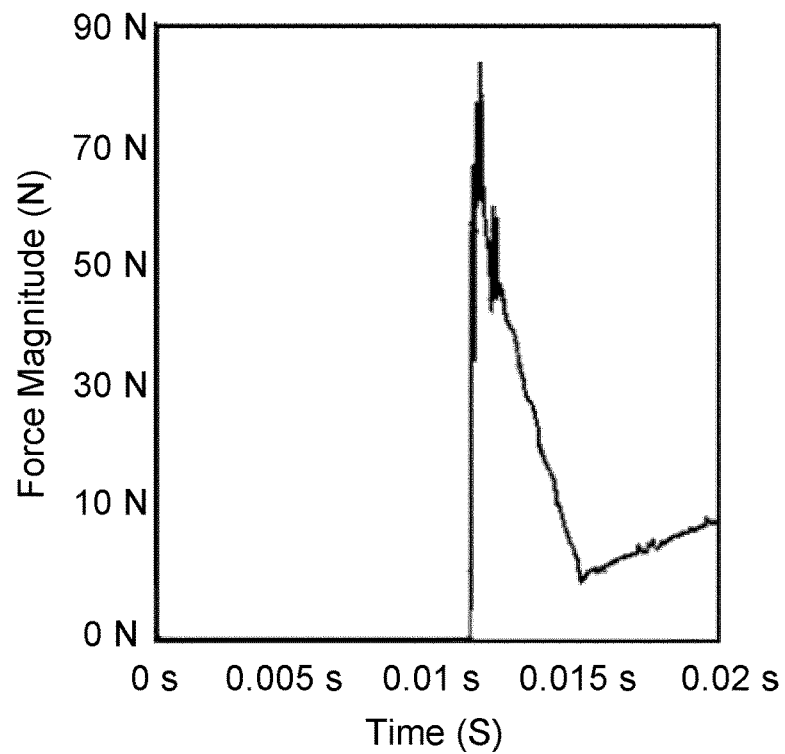
FIG. 3a is a graph showing force magnitude of the movable member in operation.
Figure 3B:
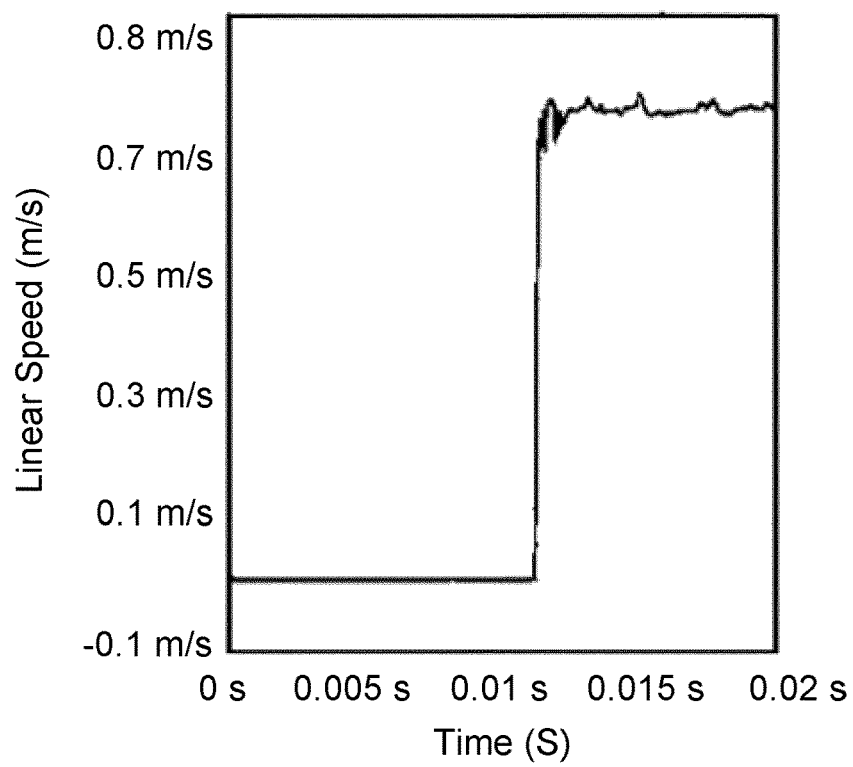
FIG. 3b is a graph showing the linear speed of the piston in operation.

In FIG. 2 the movable contact 19 is moved from the non-contact position to a position in which is in contact with the piston 5. The actuation of the movable contact 19 may be electrical or mechanical, as is known to the skilled person. The piston 5 is thus moved from the default extended position shown in FIG. 1 to the retracted position shown in FIG. 2. The force applied by the movable contact 19 is greater than a threshold value, which is determined by the design of the first, second and third resilient members and their state of compression in the body 3 in the default extended position of the piston 5.

As the piston 5 is being subjected to the force applied by the movable contact, the first ball 9 and the second ball 11 will eventually move out from the seat 5c. This initial high force to move the piston 5 is illustrated in FIG. 3a, where the x-axis shows the time and the y-axis shows the force magnitude. When the first ball 9 and the second ball 9 has moved out from the seat 5c, the piston 5 is moved axially. The piston 5 compresses the third resilient member 17 and causes the third ball 21, if present, to move in the same direction as the piston 5. The speed of the piston 5 is shown in FIG. 3b during this process. The acceleration is very fast and occurs at the same time as the large force is applied as shown in FIG. 3a. While the force applied by the movable contact 19 is reduced after the first ball 9 and the second ball 11 has been moved out from the seat 5c the speed remains substantially constant as the piston is moved to the retracted position.

The contact bounce reduction system may according to some embodiments comprise more than two balls configured to act radially on the piston. The contact bounce reduction system may for example comprise 2*N, N=2, 3, 4, 5 . . . , k balls and N seats configured to receive pairs of balls. The contact bounce reduction system may comprise 2*N resilient members, each configured to act with a radial force onto the corresponding ball to hold the ball in the corresponding seat when the piston is in the default extended position.

In this manner, sequential radial pairwise movement of balls out from the corresponding seats may for example be achieved. This may provide further control on the initial force to move the piston and the speed of the piston.

The contact bounce reduction system 1 may form part of an electrical device such as a contactor or a tap changer for a transformer such as a distribution transformer or a power transformer.

The disclosure has mainly been described above with reference to a few examples. However, as is readily appreciated by a person skilled in the art, other embodiments than the ones disclosed above are equally possible within the scope of the disclosure, as defined by the appended claims.

The invention claimed is:

1. A contact bounce reduction system comprising:
a movable member, and
a contact bounce damping device comprising:
 a body,
 a first ball and a second ball arranged in the body,
 a first resilient member and a second resilient member,
 a piston partly arranged in and extending from the body, the piston being configured to be moved linearly between a default extended position and a retracted position relative to the body, and wherein the piston has a radial seat configured to partly receive the first ball and the second ball,
 wherein the first resilient member is configured to act with a radial force onto the first ball to hold the first ball in the seat when the piston is in the default extended position,
 wherein the second resilient member is configured to act with a radial force onto the second ball to hold the second ball in the seat when the piston is in the default extended position, and
 a third resilient member configured to bias the piston towards the default extended position;
wherein the movable member is configured to move from a non-contact position relative to the piston to contact the piston and actuate the piston from the default extended position towards the retracted position with a force greater than a threshold value, causing the first ball and the second ball to move radially out from the seat, and the third resilient member to accumulate energy, and
the contact bounce reduction system further comprising a contact ring slidably arranged around the piston, and a fixed contact member electrically connected to the contact ring.

2. The contact bounce reduction system as claimed in claim 1, wherein the first ball and the second ball are arranged on opposite sides of the piston with respect to a longitudinal axis of the piston.

3. The contact bounce reduction system as claimed in claim 1, where the first ball and the second ball are arranged opposite to each other with respect to the longitudinal axis of the piston.

4. The contact bounce reduction system as claimed in claim 1, wherein the first resilient member and the second resilient member have longitudinal axes that are perpendicular to a longitudinal axis of the piston.

5. The contact bounce reduction system as claimed in claim 1, wherein the first resilient member is a first spring and the second resilient member is a second spring.

6. The contact bounce reduction system as claimed in claim 1, comprising a third ball arranged axially between the third resilient member and the piston, wherein the third resilient member is configured to act with an axial force onto the third ball.

7. The contact bounce reduction system as claimed in claim 1, comprising a first holding member, and wherein the body has a first channel in which the first resilient member is arranged, wherein the first holding member is removably arranged in the first channel to hold the first resilient member in position to act on the first ball.

8. The contact bounce reduction system as claimed in claim 1, comprising a second holding member, and wherein the body has a second channel in which the second resilient member is arranged, wherein the second holding member is removably arranged in the second channel to hold the second resilient member in position to act on the second ball.

9. The contact bounce reduction system as claimed in claim 1, comprising a third holding member, and wherein the body has a third channel in which the third resilient member is arranged, wherein the third holding member is removably arranged in the third channel to hold the third resilient member in position to act on the piston.

10. The contact bounce reduction system as claimed in claim 1, wherein the seat has a curved shape configured to bear against at least $\frac{1}{8}^{th}$ of the circumference of each of the first ball and the second ball.

11. An electrical device comprising the contact bounce reduction system as claimed in claim 1.

12. The electrical device as claimed in claim 11, wherein the electrical device is a contactor or a tap changer for a transformer.

* * * * *